United States Patent [19]

Milner et al.

[11] 4,076,926

[45] Feb. 28, 1978

[54] POLYMERIZATION CATALYST COMPRISING ALUMINUM HALIDE AND AN ALCOHOL OR ETHER

[75] Inventors: David Lee Milner; Ian Stanley Ripley, both of Middlesbrough, England

[73] Assignee: Imperial Chemical Industries Limited, London, England

[21] Appl. No.: 684,953

[22] Filed: May 10, 1976

[30] Foreign Application Priority Data

May 14, 1975 United Kingdom ............... 20379/75

[51] Int. Cl.$^2$ .................... C08F 4/06; C08F 10/14; C08F 32/00; C08F 36/02
[52] U.S. Cl. .................... 526/209; 526/210; 526/267; 526/281; 526/290; 526/308; 526/335
[58] Field of Search .................... 526/209, 210, 237

[56] References Cited

U.S. PATENT DOCUMENTS

| | | | |
|---|---|---|---|
| 1,810,174 | 6/1931 | Herrmann et al. | 526/210 |
| 2,023,495 | 12/1935 | Thomas | 526/210 |
| 3,415,798 | 12/1968 | Sellers et al. | 526/210 |

FOREIGN PATENT DOCUMENTS

| | | |
|---|---|---|
| 677,675 | 8/1952 | United Kingdom. |
| 955,851 | 4/1964 | United Kingdom. |
| 1,235,062 | 6/1971 | United Kingdom. |
| 1,259,519 | 1/1972 | United Kingdom. |

*Primary Examiner*—Harry Wong, Jr.
*Attorney, Agent, or Firm*—Cushman, Darby & Cushman

[57] ABSTRACT

Unsaturated compounds, particularly $C_4$ to $C_{20}$ mono- and di-olefines are polymerized by a process in which the catalyst used is an aluminium trihalide such as aluminium chloride in conjunction with an alcohol or ether.

6 Claims, No Drawings

POLYMERIZATION CATALYST COMPRISING ALUMINUM HALIDE AND AN ALCOHOL OR ETHER

The present invention relates to polymerisation catalysts and to processes using such catalysts.

Polymerisation processes in which olefinically unsaturated hydrocarbons or mixtures of olefinically unsaturated are polymerised using Friedel Crafts catalysts are well known. One widely used Friedel Crafts catalyst is an aluminium halide such as aluminium chloride which may be used alone or in the form of a highly active complex with a hydrogen halide such as hydrogen chloride in an aromatic hydrocarbon such as toluene.

The mixtures of olefinically unsaturated hydrocarbons which are most frequently polymerised are those derived from petroleum fractions, for example a mixture of $C_4$, $C_5$ and $C_6$ olefines, distilled from a cracked petroleum fraction such as naphtha or gas oil. We have found that in polymerising such mixtures using an aluminium chloride catalyst there is formed a proportion of an insoluble gel which precipitates in the polymerisation reactor. In consequence not only is the yield of saleable resin reduced but operation of the manufacturing unit is adversely affected. The present invention provides an aluminium catalyst which is useful in general for polymerising unsaturated hydrocarbons and, in particular, for reducing the amount of insoluble gel which may be formed when a mixture of $C_5$ olefinically unsaturated hydrocarbons is polymerised.

Accordingly, the invention is a process for the production of a polymer by the polymerisation of an unsaturated organic compound or mixture of unsaturated organic compounds in which there is used a catalyst which comprises an aluminium trihalide and an alcohol or an ether.

The aluminium halides which may be used in the process are aluminium iodide, aluminium bromide or aluminium chloride, more usually the latter.

The alcohol may be mono-, di- or poly-hydric, aliphatic or aromatic in nature and may be a hydrocarbyl alcohol (i.e. may contain only carbon and hydrogen apart from the —OH group), or may contain other substituent atoms or groups. Preferred alcohols are alkanols containing up to 30 carbon atoms, perferably 5 to 20 carbon atoms, especially 8 to 16 atoms, e.g. nonanol, isodecanol or tetradecanol.

A useful non-hydrocarbyl alcohol is a polyalkylene glycol i.e. a diol which comprises repeating alkylene oxide units such as ethylene oxide units HO$(CH_2CH_2O)_n$, H or propylene oxide units HO$(CH(CH_3)CH_2OH)H_n$, or mixed ethylene oxide and propylene oxide units where n is a whole number, for example 1 to 15. Examples of aromatic alcohols include benzyl alcohol and ring substituted benzyl alcohols, particularly those in which the substituent(s) is a $C_1$ to $C_{18}$ alkyl group(s). Aliphatic ethers are preferred ethers for use in the process, particularly saturated aliphatic ethers containing 7 to 40 carbon atoms in the molecule, e.g. diamyl ether, dioctyl ether of hexyl hexadecyl ether.

The alcohol or ether is preferably used in an amount which corresponds to 0.1 to 1.0 mole per mole of aluminium halide, more preferably 0.1 to 0.5, particularly 0.3 to 0.5 mole per mole aluminium halide.

The unsaturated organic compound or mixture of unsaturated organic compounds which is polymerisable by the present invention may contain olefinic or aromatic unsaturation and may be hydrocarbon in nature. Olefinic hydrocarbons which are particularly amenable to polymerisation by the present process include cyclic and acyclic mono- and di-olefines containing 4 to 20 carbon atoms, e.g. butadiene and dicyclopentadiene. Mixtures of such hydrocarbons which may be used include two or more selected from cyclopentadiene, dicyclopentadiene, piperylene, isoprene, a pentene, alpha- and beta-pinene and dipentene. A mixture which gives rise to a particularly useful polymeric product is that derived by distillation from a cracked petroleum fraction such as steam cracked naphtha or gas oil. The cracked product is fractionated to yield inter alia ethylene, propylene, butenes and butadiene and what, for the sake of convenience, is termed a $C_5$ stream, although as well as 5 carbon atom hydrocarbons this stream also contains some hydrocarbons containing 4 and 6 carbon atoms respectively. The $C_5$ stream typically boils in the range $-10°$ to $80°$ C and may comprise the following constituents:

butene-1, butene-2, isobutene, butadiene, isoprene, cis- and trans- piperylene, n-pentane, iso-pentane, pentene-1, cyclopentadiene, dicylopentadiene, transpentene-2, 2-methylbutene-2, cyclopentene, cyclopentane and benzene. The $C_5$ stream is suitable for petroleum resin production with or without further treatment, inter-polymerisation of the olefinic constituents producing a resin typically pale yellow in colour melting in the temperature range $80°$ - $140°C$. The $C_5$ stream may also be modified by the addition of other olefines, e.g. monoolefines such as a butene or diolefines such as butadiene. Thus 5 to 80% of the $C_5$ stream may be replaced by one or more of such mono- and/or di-olefines. Other unsaturated compounds which may be polymerised by the process of the present invention include codimers of isoprene, piperylene and cyclopentadiene and mixtures of such codimers.

The catalysts according to the present invention may also be used to polymerise aromatic and heterocyclic compounds, e.g. styrene and styrene homologues such as alpha-methylstyrene, and coumarone/indene mixtures and aromatic fractions of petroleum origin containing 9 to 12 carbon atoms.

The catalyst according to the invention is advantageously used in conjunction with a hydrogen halide such as hydrogen chloride or hydrogen bromide. For example, aluminium chloride, the preferred catalyst, may be used as a complex with hydrogen chloride in an aromatic solvent such as toluene or a xylene, or more preferably in an alkyl or cycloalkyl benzene which is liquid at the temperature of the polymerisation and which is substituted by at least one secondary or tertiary alkyl group or by a cycloalkyl group, e.g p-cymene or, in particular, cumene (see our British Pat. No. 1,360,390).

The polymerisation process is suitably carried out at a temperature in the range $-100°$ to $+200°C$, preferably $0°$ to $200°C$, more preferably $50°$ to $150°C$ under sufficient pressure to maintain the reactants in the liquid phase.

The amount of catalyst which is used in the polymerisation is suitably 0.1 to 5.0, preferably 0.5 to 1.5% by weight aluminium halide based on the monomers to be polymerised. The catalyst may be added all at once or in portions during the course of the reaction. The alcohol or ether may be added with the aluminium trihalide or may be added separately, e.g. it may be present in the feed to be polymerised when the aluminium trihalide is added. On completion of the polymerisation reaction the catalyst complex may be decomposed by treatment with excess aqueous alkali such as sodium hydroxide or ammonia or with excess aqueous alcohol, e.g. a $C_1$ to $C_4$ alcohol such as isopropanol.

The invention will now be further described with reference to the following Examples.

EXAMPLES 1 TO 12

A catalyst was prepared by slurrying aluminium chloride (1 gram mole) in cumene (2.5 gram moles) and bubbling hydrogen chloride gas (0.6 gram mole) into the slurry to produce a dark coloured oily complex. Various alcohols were added dropwise to samples of this sluminium chloride complex when liberation of hydrogen chloride occurred.

The polymerisation feedstock comprising 150 grams of a $C_5$ distillation fraction from a steam cracked naphtha was placed in a three necked reaction flask which was fitted with a stirrer, cold finger and graduated 25 ml. dropping funnel. The $C_5$ fraction contained cyclopentadiene, dicyclopentadiene, isoprene and piperylene, the balance being mainly $C_5$ olefines and paraffins, and it was heat soaked prior to use for three hours at 120°C to dimerise the cyclopentadiene.

The catalyst under test (equivalent to 1% by weight of aluminium chloride based on the weight of feedstock) was added dropwise to the feedstock from the graduated funnel over a period of 10 minutes at ambient temperature. The mixture was then allowed to equilibrate for a five minute period following which its specific gravity was measured and the change in specific gravity due to the polymerisation calculated (the magnitude of this change is indicative of the degree of polymerisation). Finally, the resin solution was filtered through a weighed quality of glass wool to trap any insoluble gel. The gel was washed with cyclohexane to remove any residual resin solution and placed in an oven at 200°C for 3 hours. The percentage of gel based on the weight of feedstock was then calculated.

Results using a number of different alcohols are given in the following Table.

found to be 0.091 and the percentage gel by weight of be 0.057.

We claim:

1. A process for the polymerisation of an unsaturated organic compound or mixture of unsaturated organic compounds selected from the group consisting of cyclic or acyclic mono- or di-olefines containing 4 to 20 carbon atoms, styrene or a styrene homologue, a mixture of coumarone and indene, or an aromatic fraction of petroleum origin containing 9 to 12 carbon atoms which comprises:

contacting the compound or compounds at a temperature in the range −100° to +200°C with 0.1 to 5 weight percent based on the compound or compounds to be polymerised of a catalyst comprising aluminium chloride, aluminium bromide or aluminium iodide, a hydrogen halide, and an alcohol selected from the group consisting of an alkanol containing up to 30 carbon atoms, a polyalkylene glycol, benzyl alcohol and a ring substitute benzyl alcohol or a saturated aliphatic ether containing 7 to 40 carbon atoms in the molecule, said alcohol or ether being used in an amount which corresponds from 0.1 to 1.0 mole per mole of aluminium halide selected from the group consisting of aluminium chloride, aluminium bromide and aluminium iodide.

2. A process according to claim 1 in which a mixture of olefines is polymerised including two or more selected from cyclopentadiene, dicyclopentadiene, piperylene, isoprene, a pentene, alipha- and beta-pinene and dipentene.

3. A process according to claim 2 in which the mixture is a $C_5$ stream as hereinbefore defined derived by distillation from a cracked petroleum fraction.

4. A process according to claim 1 in which the catalyst is a complex of aluminium chloride and hydrogen chloride dissolved in an aromatic solvent.

5. A process according to claim 1 in which an unsaturated organic compound selected from the group consisting of cyclic mono-olefines containing 4 to 20 carbon atoms, cyclic diolefines containing 4 to 20 carbon atoms, acyclic mono-olefines containing 4 to 20 carbon

| Example No. | Alcohol | No. of moles Alcohol | Change in specific gravity | Gel Percentage by weight |
|---|---|---|---|---|
| Comparison | — | — | 0.090 | 7.2 |
| 1 | Isopropanol | 0.4 | 0.080 | 0.12 |
| 2 | n-Butanol | 0.45 | 0.081 | 0.16 |
| 3 | Nonanol | 0.45 | 0.074 | 0.05 |
| 4 | Nonanol* | 0.45 | 0.087 | 0.14 |
| 5 | Nonanol | 0.33 | 0.088 | 0.04 |
| 6 | Nonanol* | 0.33 | 0.082 | 0.03 |
| 7 | SUNPROL+ | 0.33 | 0.088 | 0.03 |
| 8 | SYNPROL*+ | 0.33 | 0.086 | 0.036 |
| 9 | SYNPROL+ | 0.45 | 0.087 | 0.024 |
| 10 | SYNPROL*+ | 0.45 | 0.080 | 0.019 |
| 11 | SYNPROL+ | 0.55 | 0.071 | 0.01 |
| 12 | SYNPROL*+ | 0.55 | 0.069 | 0.01 |

*The catalyst was made up without hydrogen chloride in these Examples and in these instances little evolution of HCl gas occurred.
+SYNPRL is a trademark and represents a mixture of $C_{13}$ and $C_{15}$ alcohols derived by hydroformylation from a mixture of $C_{12}$ and $C_{14}$ olefines.

EXAMPLE 13

A catalyst was prepared as in Example 1 but instead of adding alcohol 0.45 mole of di-isoamyl ether was added dropwise over 1 hour.

The catalyst so prepared was used to polymerise a feedstock similar to that used in Example 1 and using the same method. The change in specific gravity was atoms, acyclic diolefines containing 4 to 20 carbon atoms, styrene, styrene homologues, a mixture of coumarone and indene, and an aromatic fraction of petroleum origin containing 9 to 12 carbon atoms is contacted at at temperature in the range −100° to +200°C with a catalyst complex comprising:

(a) aluminium chloride complexed with hydrogen chloride, in an aromatic solvent selected from the group consisting of toluene, xylene or an alkyl or cycloalkyl benzene which is liquid at the temperature of the polymerisation and which is substituted by at least one secondary or tertiary alkyl group or by a cycloalkyl group and, (b) an alcohol containing 5 to 20 carbon atoms, a polyalkylene glycol comprising 1 to 15 repeating ethylene oxide and/or propylene oxide units, benzyl alcohol, a benzyl alcohol substituted in the ring by a $C_1$ to $C_{18}$ alkyl group or an aliphatic ether containing 7 to 40 carbon atoms in the molecule, the amount of catalyst complex used being 0.1 to 5.0% by weight aluminium chloride based on the monomer to be polymerised and the alcohol or ether being used in an amount which corresponds from 0.1 to 1.0 mole per mole of aluminium chloride.

6. A process according to claim 1 in which the catalyst also comprises a hydrogen halide.

* * * * *